(12) United States Patent
Kiuchi et al.

(10) Patent No.: US 9,868,161 B2
(45) Date of Patent: Jan. 16, 2018

(54) BALL-END MILL AND INSERT

(71) Applicant: Hitachi Tool Engineering, Ltd., Tokyo (JP)

(72) Inventors: Yasuhiro Kiuchi, Narita (JP);
Yoshimitsu Nagashima, Narita (JP);
Yoshiyuki Kobayashi, Narita (JP);
Yuuki Hayashi, Narita (JP)

(73) Assignee: Hitachi Tool Engineering, Ltd., Minato-ku, Tokyo (JP)

( * ) Notice: Subject to any disclaimer, the term of this patent is extended or adjusted under 35 U.S.C. 154(b) by 295 days.

(21) Appl. No.: 14/431,877

(22) PCT Filed: Sep. 19, 2013

(86) PCT No.: PCT/JP2013/075286
§ 371 (c)(1),
(2) Date: Mar. 27, 2015

(87) PCT Pub. No.: WO2014/057783
PCT Pub. Date: Apr. 17, 2014

(65) Prior Publication Data
US 2015/0258617 A1  Sep. 17, 2015

(30) Foreign Application Priority Data

Oct. 10, 2012 (JP) .................................. 2012-224872
Dec. 3, 2012 (JP) .................................. 2012-264058

(51) Int. Cl.
*B23C 5/02* (2006.01)
*B23C 5/10* (2006.01)

(52) U.S. Cl.
CPC ...... *B23C 5/1036* (2013.01); *B23C 2200/203* (2013.01); *B23C 2200/286* (2013.01);
(Continued)

(58) Field of Classification Search
CPC ................ G01N 3/20; B23C 2210/084; B23C 2200/203; B23C 5/1036; B23C 2200/08;
(Continued)

(56) References Cited

U.S. PATENT DOCUMENTS 5,348,426 A * 9/1994 Krupp ................... B23C 5/1036
407/40
5,580,194 A * 12/1996 Satran ................... B23C 5/1036
407/114
(Continued)

FOREIGN PATENT DOCUMENTS

EP 1228831 A1 * 8/2002 ........... B23C 5/1036
JP 62-12503 Y2 4/1987
(Continued)

OTHER PUBLICATIONS

International Search Report for PCT/JP2013/075286 dated Oct. 22, 2013 [PCT/ISA/210].

*Primary Examiner* — Sara Addisu
(74) *Attorney, Agent, or Firm* — Sughrue Mion, PLLC

(57) ABSTRACT

A ball-end mill includes arcuate cutting edges each extending from a tip end to a peripherally outermost point along a S shape curve when viewed from the front side, spirally-shaped, peripheral cutting edges each smoothly connected to each arcuate cutting edge, and a convex rake face of each arcuate cutting edge protruding forward in a rotation direction. Each arcuate cutting edge has a radial rake angle satisfying $\beta < \alpha \leq \gamma$, where $\alpha$ is a radial rake angle at a radial angle of 5°, $\beta$ is a radial rake angle at a radial angle of 90°, and $\gamma$ is a radial rake angle at a rotationally most projecting point of the arcuate cutting edge. The radial rake angle has the maximum value at a radial angle in a range of 12-40° and continuously decreases in a range from the rotationally most projecting point to the peripherally outermost point.

20 Claims, 11 Drawing Sheets

(52) U.S. Cl.
CPC ............... *B23C 2210/0414* (2013.01); *B23C 2210/0442* (2013.01); *Y10T 407/1924* (2015.01); *Y10T 407/235* (2015.01)

(58) Field of Classification Search
CPC ........ B23C 2200/083; B23C 2200/286; B23C 2210/0414; B23C 2210/0442
See application file for complete search history.

(56) References Cited

U.S. PATENT DOCUMENTS

| | | | | |
|---|---|---|---|---|
| 5,586,843 A * | 12/1996 | Minicozzi | ............... | B23C 5/109 407/113 |
| 5,622,460 A * | 4/1997 | Satran | ................... | B23C 5/1045 407/42 |
| 5,632,576 A * | 5/1997 | Storch | ................... | B23C 5/1036 407/114 |
| 5,772,365 A * | 6/1998 | Vogel | ................... | B23C 5/1045 407/114 |
| 5,782,589 A * | 7/1998 | Cole | ................... | B23B 51/048 407/33 |
| 5,915,888 A * | 6/1999 | Minicozzi | ............. | B23C 5/1036 407/113 |
| 5,971,671 A * | 10/1999 | Mina | ................... | B23C 5/1036 407/113 |
| 6,023,461 A | 2/2000 | Raychaudhuri et al. | | |
| 6,123,487 A * | 9/2000 | Mina | ................... | B23C 5/1036 407/114 |
| 6,158,927 A * | 12/2000 | Cole | ................... | B23B 51/048 407/113 |
| 6,193,446 B1 * | 2/2001 | Astrom | ................... | B23C 5/202 407/114 |
| 6,231,275 B1 * | 5/2001 | Kunimori | ................ | B23C 5/1036 407/42 |
| 6,582,165 B1 * | 6/2003 | Baba | ................... | B23C 5/1036 407/40 |
| 6,976,815 B2 * | 12/2005 | Berglow | ................... | B23C 5/10 407/54 |
| 7,044,695 B2 * | 5/2006 | Stojanovski | .......... | B23C 5/1036 407/36 |
| 7,125,210 B2 * | 10/2006 | Kolker | ................... | B23C 5/10 407/34 |
| 7,226,249 B2 * | 6/2007 | Tsuchitani | ............ | B23C 5/1036 407/42 |
| 8,177,459 B2 * | 5/2012 | Hughes | ................... | B23C 5/1036 407/113 |
| 8,807,882 B2 * | 8/2014 | Volokh | ................... | B23C 5/10 407/53 |
| 8,882,406 B2 * | 11/2014 | Hobohm | ................... | B23C 5/10 407/53 |
| 2001/0033776 A1 * | 10/2001 | Villa | ................... | B23C 5/1036 407/33 |
| 2002/0094244 A1 * | 7/2002 | Satran | ................... | B23C 5/1036 407/33 |
| 2004/0057802 A1 * | 3/2004 | Flolo | ................... | B23C 5/1036 407/53 |
| 2006/0060053 A1 * | 3/2006 | Tanaka | ................... | B23C 5/10 83/663 |
| 2011/0008112 A1 * | 1/2011 | Abe | ........................ | B23C 5/109 407/42 |
| 2011/0299945 A1 * | 12/2011 | Choi | ................... | B23C 5/1036 407/11 |
| 2013/0051937 A1 | 2/2013 | Volokh et al. | | |
| 2013/0243537 A1 * | 9/2013 | Ogata | ................... | B23C 5/109 407/115 |
| 2015/0258617 A1 * | 9/2015 | Kiuchi | ................... | B23C 5/1036 407/42 |

FOREIGN PATENT DOCUMENTS

| | | | | |
|---|---|---|---|---|
| JP | 5-42410 A | | 2/1993 | |
| JP | 06047614 A | * | 2/1994 | ............ B23C 5/109 |
| JP | 8-118133 A | | 5/1996 | |
| JP | 10-80815 A | | 3/1998 | |
| JP | 10291116 A | * | 11/1998 | .......... B23C 5/1036 |
| JP | 11-156624 A | | 6/1999 | |
| JP | 2004-181563 A | | 7/2004 | |
| JP | 2004-291096 A | | 10/2004 | |
| JP | 2007144625 A | * | 6/2007 | |
| JP | 2008-110437 A | | 5/2008 | |
| WO | 2011/062901 A2 | | 5/2011 | |

\* cited by examiner

Fig. 5 Amended
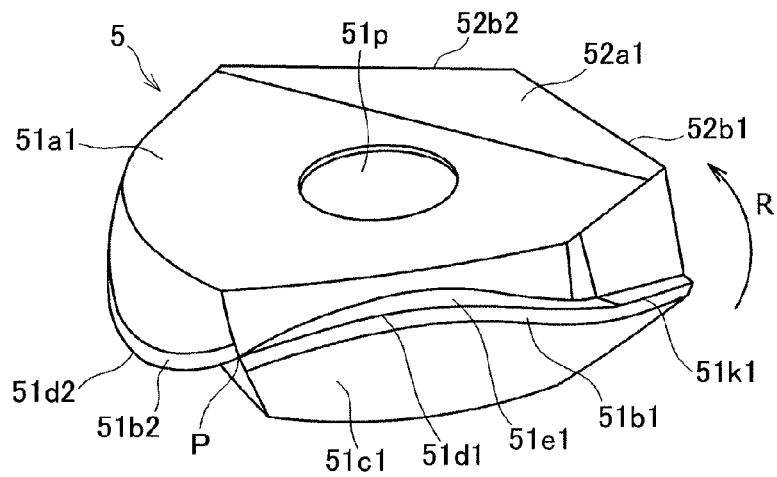

Fig. 15

| Radial Cutting Depth | Radial Rake Angle at Radial Angle of 90° | | |
|---|---|---|---|
| | Insert 1 (0°) | Insert 2 (3°) | Insert 3 (6°) |
| 0.15 mm | Ry = 5.5 μm | Ry = 4.3 μm | Ry = 4.4 μm |
| 0.3 mm | Ry = 6.0 μm | Ry = 4.4 μm | Ry = 4.5 μm |

BALL-END MILL AND INSERT

CROSS REFERENCE TO RELATED APPLICATIONS

This application is a National Stage of International Application No. PCT/JP2013/075286 filed Sep. 19, 2013, claiming priority based on Japanese Patent Application No. 2012-224872, filed Oct. 10, 2012 and Japanese Patent Application Number 2012-264058, filed Dec. 3, 2012, the contents of all of which are incorporated herein by reference in their entirety.

FIELD OF THE INVENTION

The present invention relates to a solid or indexable ball-end mill suitable for three-dimensionally finishing a work, and an insert attached to an indexable ball-end mill.

BACKGROUND OF THE INVENTION

Ball-end mills have conventionally been used to three-dimensionally cut flat surfaces and curved surfaces of works such as molding dies, etc. To carry out the three-dimensional finishing of works with good surface roughness by ball-end mills, cutting edges should be free from chipping and cracking, with suppressed vibration for improved chip removal. To this end, it is important to adjust rake angles of arcuate cutting edges of ball-end mills. Accordingly, various proposals have been made so far, on the rake angles of arcuate cutting edges.

JP 10-80815 A discloses a ball-end mill suitable for three-dimensional cutting of curved surfaces of molding dies, etc., which has an rake angle of −2° to −20° in peripheral cutting edges for strengthening, and an rake angle of 0° to +10° near an axial center for better chip removal. Specifically, it describes an example in which the rake angle is +3° near a tip end, and −10° near peripheral cutting edges. However, because the rake angle of the cutting edge at the most projecting position is negative, this ball-end mill has poor capability of finishing works with high accuracy.

JP 2008-110437 A proposes a CBN ball-end mill comprising ball-end cutting edges and peripheral cutting edges, a normal rake angle of each ball-end cutting edge being −5° to −15° at R10°, −5° to +3° in a range of R50° to R70° and having a peak, and −10° to 0° at R90°, thereby suppressing chipping in the entire ball-end cutting edges for a long life. A specific example of the normal rake angles of the ball-end cutting edges is −10° at R10°, peak with 0° at R60°, and −5° at R90°, with gradual change in a plus direction in a range from R10° to R60°, and gradual change in a minus direction in a range from R60° to R90°. However, because this ball-end mill has a peak in a normal rake angle in a range from R50° to R70°, with a larger negative normal rake angle at R10° than at R90°, it suffers poor capability of finishing works with high accuracy.

JP 8-118133 A proposes a ball-end mill for cutting relatively soft works such as wood, non-ferrous metals, etc. smoothly with high accuracy, which comprises curved cutting edges, a rake angle of each cutting edge being 10-30° in a tip end portion with end cutting edges, and 20-40° in a peripheral portion, with an intermediate rake angle continuously changing from the rake angle of the end cutting edge to that in the peripheral portion in a corner portion. An example of the rake angles is 10° in the tip end portion and 20° in the peripheral portion, and another example is 20° in the tip end portion and 30° in the peripheral portion. Because the rake angle of each cutting edge is larger in the peripheral portion than in the tip end portion, and intermediate between those of the tip end portion and the peripheral portion in the corner portion, this ball-end mill cannot be used to finish high-hardness works (Rockwell hardness: 40 HRC or more) such as molding dies, etc.

JP 2004-181563 A proposes a ball-end mill comprising ball-end cutting edges whose center cutting edges are formed by rake faces; a clearance angle of each ball-end cutting edge being smaller than that of each center cutting edge; and each ball-end cutting edge having a normal rake angle gradually increasing to the positive side from a center toward a periphery, thereby having improved strength and chip removal. For example, a center cutting edge of each ball-end cutting edge has a normal rake angle of −45° at center, and gradually and positively increasing to −10° toward the periphery. However, because each center cutting edge has a largely negative normal rake angle, this ball-end mill has poor capability of finishing works with high accuracy.

Japanese Utility Model 62-12503 Y2 proposes a ball-end mill comprising ball-end cutting edges looked an S shape when viewed from the tip end side; a normal rake angle of each ball-end cutting edge being negative at a rotation axis center, and positive with gradual increase on the periphery side. However, because the rake angle of each ball-end cutting edge gradually increases on the positive side from the rotation axis center toward the periphery side for improved chip removal and cutting edge strength, this ball-end mill has poor capability of finishing works with high accuracy.

JP 2004-291096 A proposes a throwaway chip having twisted arcuate cutting edges; the thickness of a chip body at a position perpendicular to its rotation axis being in a range of 0.5 D to 0.9 D, wherein D is the thickness (mm) of a flat plate portion of the chip body; and the radial angle being 40-70° at a point most projecting in a rotation direction. However, JP 2004-291096 A never discloses the change of a rake angle depending on the radial angle of the throwaway chip. In addition, this throwaway chip does not have twisted peripheral cutting edges connected to rear ends of arcuate cutting edges. Accordingly, it is not suitable to three-dimensionally finish works having vertical walls with good surface roughness.

OBJECTS OF THE INVENTION

Accordingly, the first object of the present invention is to provide a solid or indexable ball-end mill capable of three-dimensionally finishing works having vertical walls with good surface roughness, and an insert attached to such an indexable ball-end mill.

The second object of the present invention is to provide a solid or indexable ball-end mill preventing chips from being bitten into a gap between a cutting edge and a work, and an insert attached to such an indexable ball-end mill.

The third object of the present invention is to provide a solid or indexable ball-end mill with suppressed vibration by reduced cutting resistance and amplitude thereof, and an insert attached to such an indexable ball-end mill.

DISCLOSURE OF THE INVENTION

The ball-end mill of the present invention comprises, in a tip end portion of an end mill body, arcuate cutting edges each extending from a tip end to a peripherally outermost point along a curve in an S shape when viewed from the front side, spirally-shaped, peripheral cutting edges each smoothly connected to each arcuate cutting edge, and a convex rake face of each arcuate cutting edge protruding forward in a rotation direction;

each of the arcuate cutting edges having a radial rake angle meeting the condition of $\beta<\alpha\leq\gamma$, wherein $\alpha$ is a radial rake angle at a radial angle of 5°, $\beta$ is a radial rake angle at a radial angle of 90°, and $\gamma$ is a radial rake angle at a rotationally most projecting point of the arcuate cutting edge;

the radial rake angle of the arcuate cutting edge having the maximum value in a radial angle range of 12-40°; and the radial rake angle continuously decreasing in a range from the rotationally most projecting point to the peripherally outermost point.

The insert of the present invention comprises arcuate cutting edges each extending from a tip end to a peripherally outermost point along a curve in an S shape when viewed from the front side, spirally-shaped, peripheral cutting edges each smoothly connected to each arcuate cutting edge, and a convex rake face of each arcuate cutting edge protruding forward in a rotation direction;

each of the arcuate cutting edges having a radial rake angle meeting the condition of $\beta<\alpha\leq\gamma$, wherein $\alpha$ is a radial rake angle at a radial angle of 5°, $\beta$ is a radial rake angle at a radial angle of 90°, and $\gamma$ is a radial rake angle at a rotationally most projecting point of the arcuate cutting edge;

the radial rake angle of the arcuate cutting edge having the maximum value in a radial angle range of 12-40°; and the radial rake angle continuously decreasing in a range from the rotationally most projecting point to the peripherally outermost point.

The radial rake angle $\gamma$ is preferably a positive angle.

The radial rake angle $\beta$ is preferably a positive angle of 0° or more.

The difference between the radial rake angle $\alpha$ and the radial rake angle $\beta$ is preferably 2-6°.

The difference between the radial rake angle $\gamma$ and the radial rake angle $\alpha$ is preferably 0-2°.

The difference between the radial rake angle $\gamma$ and the radial rake angle $\beta$ is preferably 2-6°.

The difference between the maximum value of the radial rake angle and the radial rake angle $\gamma$ is preferably 0.1-1.0°.

The radial rake angles $\alpha$, $\beta$ and $\gamma$ preferably meet the conditions of $2°\leq\alpha\leq10°$, $0°\leq\beta\leq6°$, and $3°\leq\gamma\leq14°$, respectively.

The arcuate cutting edge preferably has a rotationally most projecting point at a position at which the radial angle is 30-47°.

The radial rake angle of the arcuate cutting edge preferably meets the relation of $\theta1<\theta2$, wherein $\theta1$ is a radial rake angle in a range from the rotationally most projecting point to the peripherally outermost point, and $\theta2$ is a radial rake angle in a range from the rotationally most projecting point to the tip end.

The arcuate cutting edge preferably has a negative axial rake angle in a range from the tip end to the rotationally most projecting point, and a positive axial rake angle in a range exceeding the rotationally most projecting point to the peripherally outermost point.

The insert preferably has a thickness T (mm) in a flat plate portion and a thickness $T_S$ (mm) at the peripherally outermost point S, with the condition of $0.4\ T\leq T_S<0.5\ T$ met.

A crossing angle $\delta1$ of a line connecting the rear end point R of the peripheral cutting edge and the rotationally most projecting point Q to the rotation axis is preferably 15-30°, smaller than a crossing angle $\delta2$ of a line connecting the peripherally outermost point S and the rear end point R to the rotation axis.

The peripheral cutting edge preferably has a length meeting the condition of 0.2 T-0.5 T, wherein T is the thickness (mm) of a flat plate portion of the insert.

The indexable ball-end mill of the present invention comprises the above insert fixed to a slit in a semispherical tip end portion of an end mill body.

BRIEF DESCRIPTION OF THE DRAWINGS

FIG. 5 is a perspective view showing an insert according to an embodiment of the present invention.

FIG. 6(*b*) is a front view showing the insert of FIG. 5.

FIG. 6(*c*) is a side view showing the insert of FIG. 5.

FIG. 15 is photomicrographs each showing an oblique wall of a work cut by an indexable ball-end mill having each insert of Example and Comparative Example.

DESCRIPTION OF THE PREFERRED EMBODIMENTS

The embodiments of the present invention will be explained in detail below referring to the attached drawings, of course without intention of restricting the present invention thereto. Various modifications and additions may be made within the technical idea of the present invention. Explanations of each embodiment are applicable to other embodiments unless otherwise mentioned.

Because a solid ball-end mill has a structure in which an end mill body is integrated with an insert having cutting edges, it does not differ in shape from an indexable ball-end mill. Accordingly, explanations of the indexable ball-end mill and the insert are applicable to the solid ball-end mill.

[1] Indexable Ball-End Mill

Figure 1:
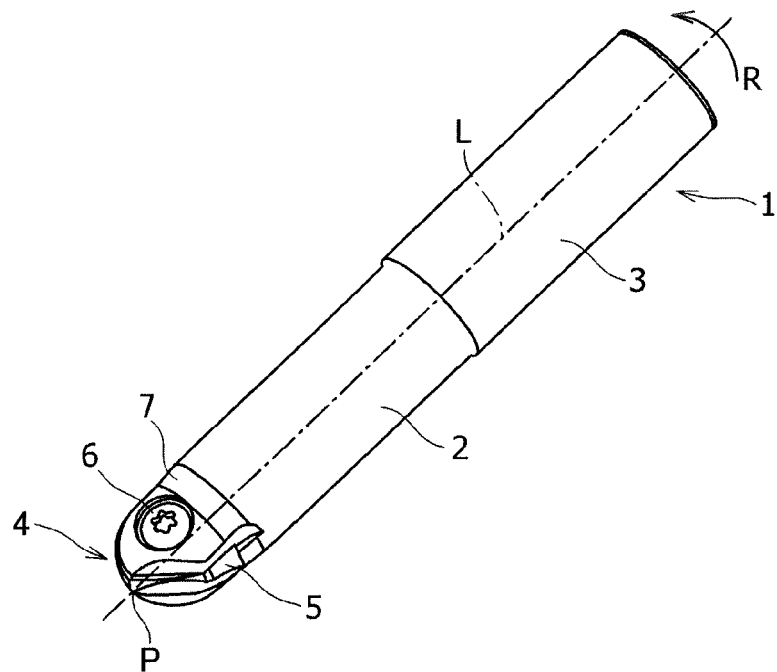
FIG. 1 is a perspective view showing an indexable ball-end mill according to an embodiment of the present invention.
Figure 2:
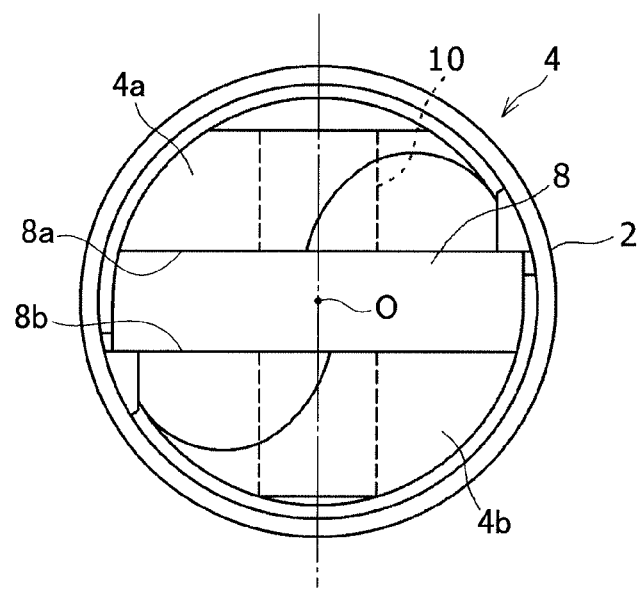
FIG. 2 is a front view showing a tip end portion of the indexable ball-end mill of FIG. 1, to which an insert is not attached.
Figure 3:
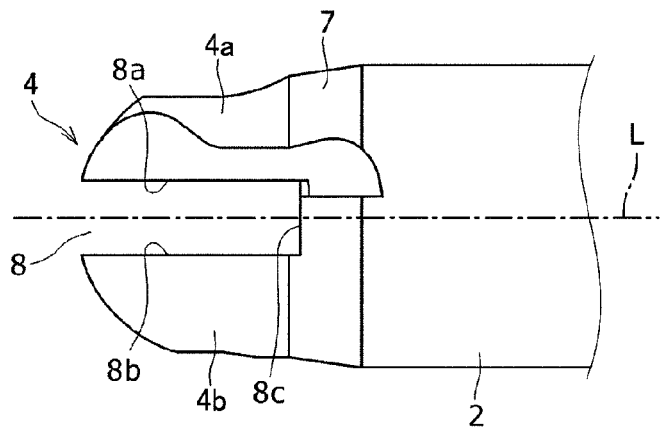
FIG. 3 is a side view showing a tip end portion of the indexable ball-end mill of FIG. 1, to which an insert is not attached.
Figure 4:
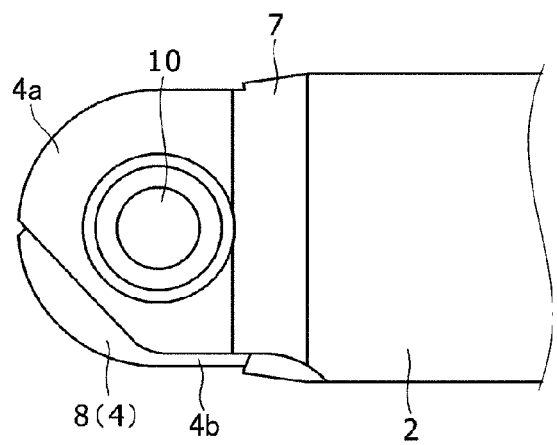
FIG. 4 is a side view showing a tip end portion of the indexable ball-end mill of FIG. 1, to which an insert is not attached, in a direction perpendicular to FIG. 3.

FIGS. 1-4 show an indexable ball-end mill 1 according to an embodiment of the present invention, and FIG. 5 shows an insert attached to the indexable ball-end mill 1. As shown in FIG. 1, indexable ball-end mill 1 comprises a end mill body 2 rotating around a rotation axis L, a shank 3 integrally connected to a rear end of the end mill body 2, and a semispherical tip end portion 4 integrally connected to a tip end of the end mill body 2 via a tapered portion 7. As shown in FIGS. 2 and 3, the semispherical tip end portion 4 comprises a slit 8 extending in a direction perpendicular to the rotation axis L (radial direction) for receiving an insert 5, and a screw hole 10 (its centerline crosses the rotation axis L) penetrating the semispherical tip end portion 4 in a direction perpendicular to the slit 8 to fix the insert 5. A clamp screw 6 threadably engages the screw hole 10 to detachably fix the insert 5. The end mill body 2, the shank 3 and the semispherical tip end portion 4 are made of, for example, alloyed tool steels such as SKD61, etc.

As shown in FIG. 3, the slit 8 has two inner surfaces 8a, 8b extending in parallel with the rotation axis L as a center, and a bottom surface 8c. The semispherical tip end portion 4 is radially divided by the slit 8 to constitute a pair of tip end halves 4a, 4b.

[2] Insert

Figure 6A:
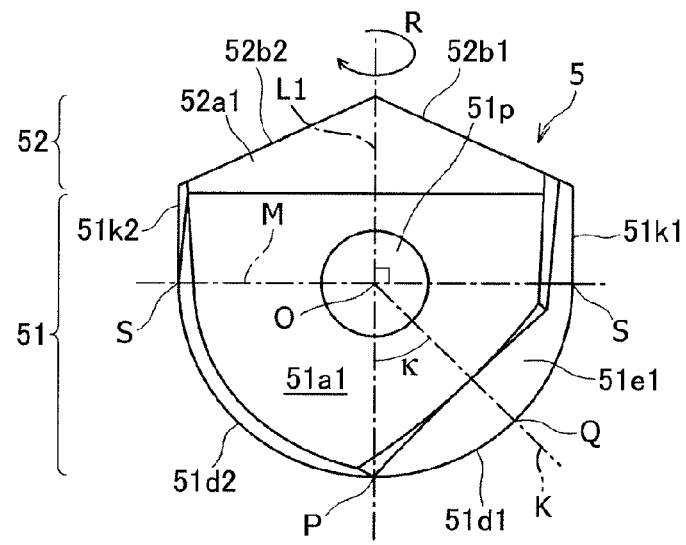
FIG. 6(*a*) is a plan view showing the insert of FIG. 5.
Figure 6B:
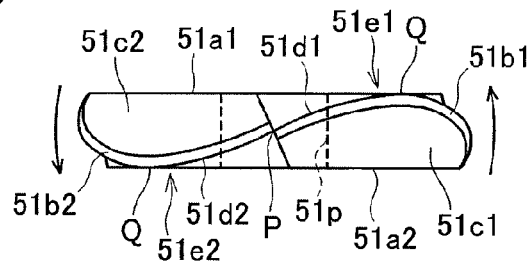
Figure 6C:
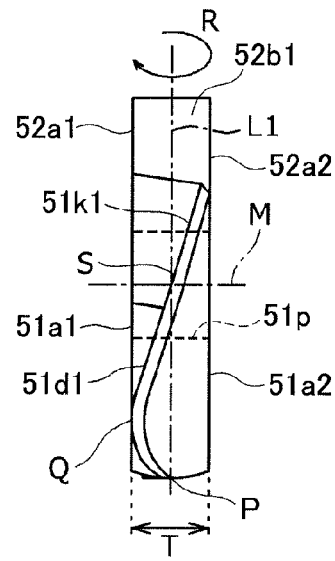

As shown in FIGS. 5 and 6, the insert 5 has a flat plate shape having a pair of parallel flat side surfaces 51a1, 51a2 with a thickness T, a semicircular portion 51 having an arcuate surface connecting a pair of side surfaces 51a1, 51a2, and a triangular portion 52 integrally connected to a rear end of the semicircular portion 51.

The semicircular portion 51 comprises first flanks 51b1, 51b2 and second flanks 51c1, 51c2 constituting an end surface connecting a pair of side surfaces 51a1, 51a2, convex rake faces 51e1, 51e2, arcuate cutting edges 51d1, 51d2 extending along ridges between the first flanks 51b1, 51b2 and the rake faces 51e1, 51e2, a pair of spirally-shaped, peripheral cutting edges 51k1, 51k2 each connected smoothly (with no inflection point) to each arcuate cutting edge 51d1, 51d2 at each point S, and a penetrating hole 51p having a centerline passing a center point O of the arcuate cutting edges 51d1, 51d2 for receiving a clamp screw 6. The center point O is positioned at a middle point of the centerline of the penetrating hole 51p (middle point of the insert 5 in a thickness direction). The points S are peripherally outermost points of the arcuate cutting edges 51d1, 51d2, at which a straight line M perpendicular to the rotation axis L1 and passing the circle center O crosses the cutting edges. Namely, each arcuate cutting edge 51d1, 51d2 has the maximum diameter at the point S. The arcuate cutting edges 51d1, 51d2 cross the center axis (rotation axis) L1 of the insert 5 at a tip end P. The rotation axis L1 passes the tip end P of the insert 5 and the circle center O. When the insert 5 is attached to the slit 8 of the end mill body 2, the rotation axis L1 of the insert 5 is aligned with the rotation axis L of the end mill body 2, with the tip end P of the insert 5 on the rotation axis L of the end mill body 2.

The triangular portion 52 comprises a pair of parallel and flat triangular side surfaces 52a1, 52a2, and oblique bottom surfaces 52b1, 52b2 connecting the triangular side surfaces 52a1, 52a2. The oblique bottom surfaces 52b1, 52b2 come into close contact with the bottom surface 8c of the slit 8.

As shown in FIGS. 5 and 6, each arcuate cutting edge 51d1, 51d2 is convex (projecting) forward in the rotation direction R of the indexable ball-end mill 1, and is in a substantially S shape with the tip end P as a center when viewed from the front side. As shown in FIG. 6(b), each arcuate cutting edge 51d1, 51d2 is most projecting in the rotation direction R at a point Q. Accordingly, the point Q is called "rotationally most projecting point." In FIG. 6(a), K represents a straight line connecting the circle center O and the rotationally most projecting point Q.

Figure 9:
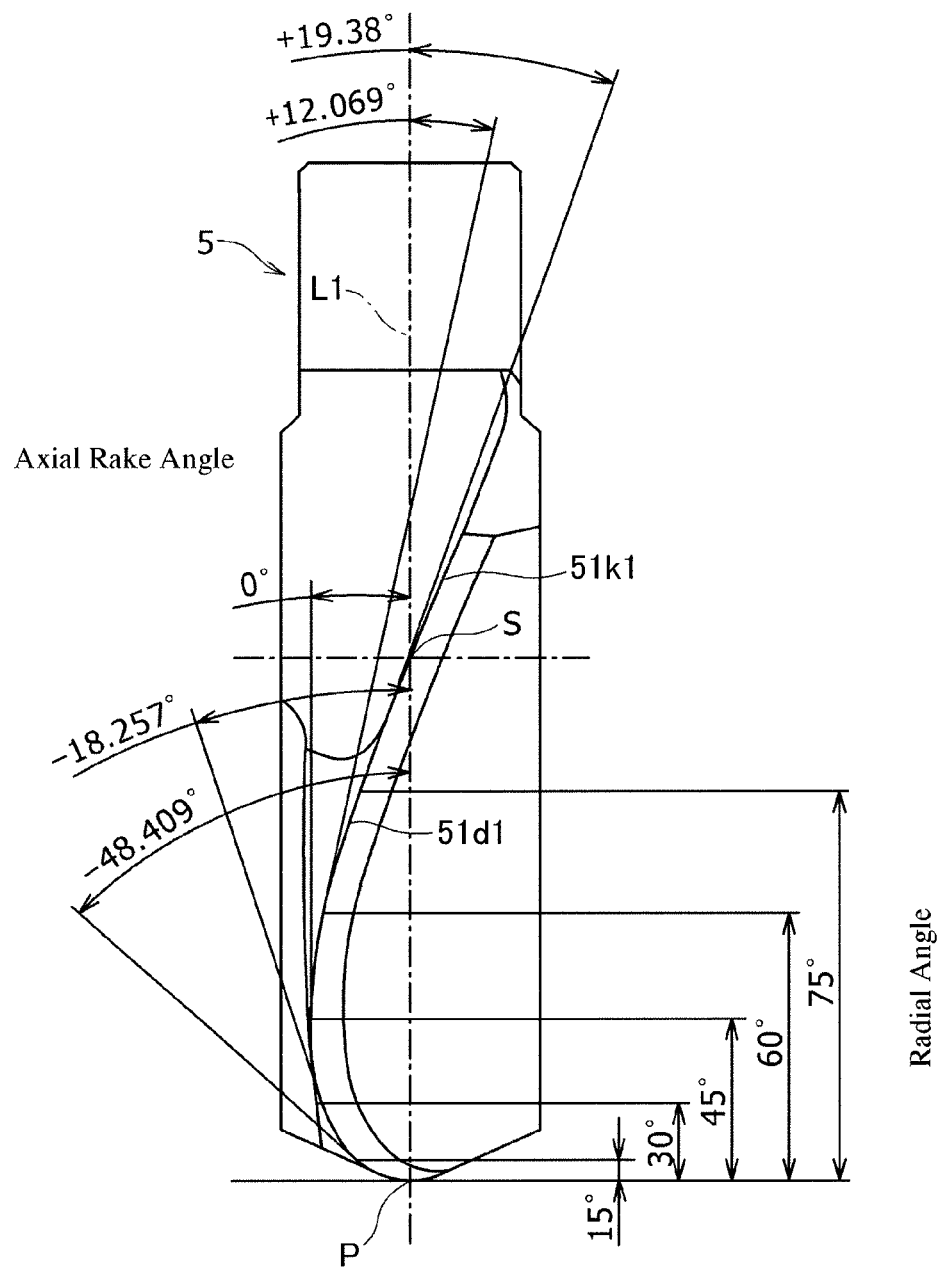
FIG. 9 is a side view showing the relation between an axial rake angle and a radial angle in an arcuate cutting edge of the insert of the present invention.

Each spirally-shaped, peripheral cutting edge 51k1, 51k2 is a straight line parallel with the rotation axis L1 on the plan view of FIG. 6(a), and inclined to the rotation axis L1 on the side view of FIG. 9. Accordingly, when the insert 5 attached to the slit 8 is rotated, a pair of peripheral cutting edges 51k1, 51k2 constitute a cylindrical rotation locus. Particularly in the case of cutting a corner of a work, the spirally-shaped, peripheral cutting edges 51k1, 51k2 act to finish-cut a vertical wall with good surface roughness. If a pair of peripheral cutting edges were radially arcuate, cutting steps would be left on the cut surface, resulting in large surface roughness, though they are effective to reduce cutting resistance.

Because the peripheral cutting edges 51k1, 51k2 are positioned on a cylindrical surface [straight lines in FIG. 6(a)], the cutting edges of the insert 5 can be repeatedly reground. If the peripheral cutting edges were radially arcuate, the cutting edges could not be reground because regrinding reduces the diameters of the cutting edges.

(A) Conditions of Rake Angle of Each Arcuate Cutting Edge

The rake angle of each arcuate cutting edge 51d1, 51d2 has a radial rake angle and an axial rake angle. The "radial rake angle" is an angle of each rake face 51e1, 51e2 to a straight line radially extending from the circle center O to each arcuate cutting edge 51d1, 51d2 (radial straight line), which may be called "normal rake angle." The "axial rake angle" is an angle of a tangent line of each arcuate cutting edge 51d1, 51d2 to the rotation axis L1 on a side view of the insert 5 shown in FIG. 9.

(1) Radial Rake Angle

Figure 7:
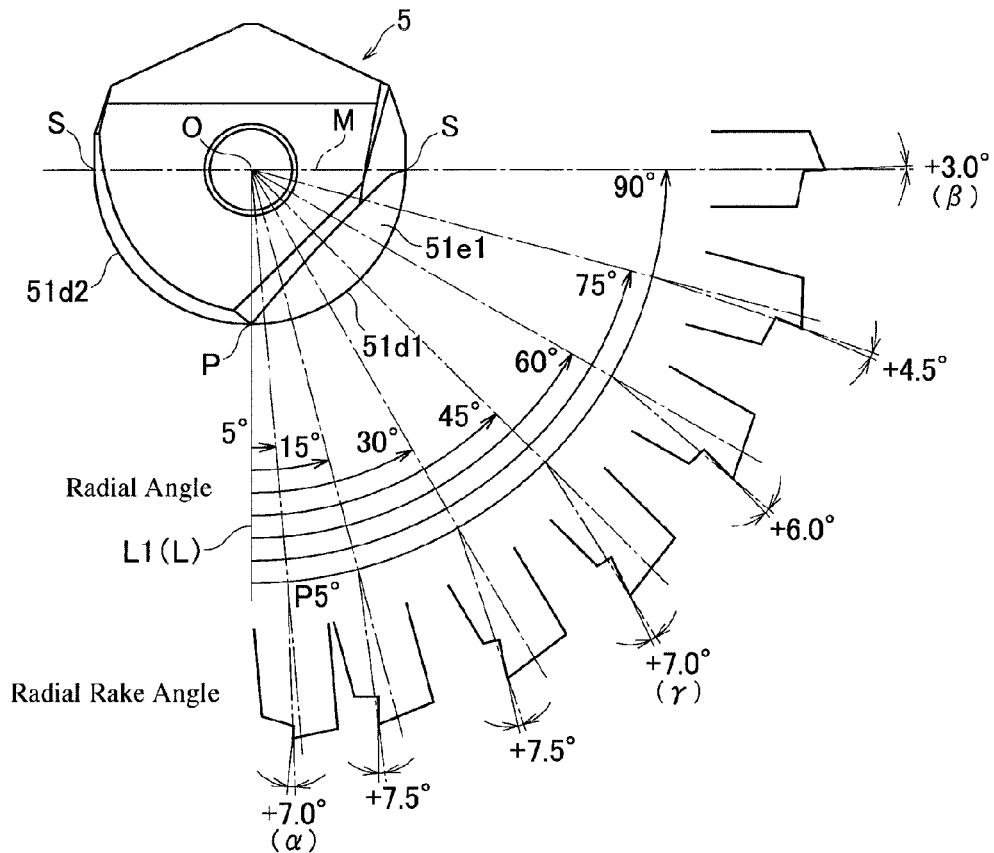
FIG. 7 is a schematic view showing the relation between a radial rake angle and a radial angle in an arcuate cutting edge of the insert of the present invention.

At a positive radial rake angle, as shown in FIG. 7, the rake face 51e1 is positioned rearward a straight line connecting the circle center O and the arcuate cutting edge 51d1 in the rotation direction R (inclined forward in the rotation direction R). At a negative radial rake angle, the rake face 51e1 is oppositely positioned.

With respect to one cutting edge 51d1, FIG. 7 shows examples of the radial rake angle at positions deviated from the rotation axis L1 by radial angles of 5°, 15°, 30°, 45°, 60°, 75°, and 90°, respectively, between the tip end P of the arcuate cutting edge 51d1 and the rear end point S. For example, a radial rake angle at a position P5° at a radial angle of 5° is an inclination angle of the rake face 51e1 at the position P5° to a straight line connecting the circle center O and the point P5° of the arcuate cutting edge 51d1. In the example shown in FIG. 7, the radial rake angles at radial angles of 5°, 15°, 30°, 45°, 60°, 75°, and 90° are +7.0°, +7.5°, +7.5°, +7.0°, +6.0°, +4.5°, and +3.0°, respectively.

Figure 8:
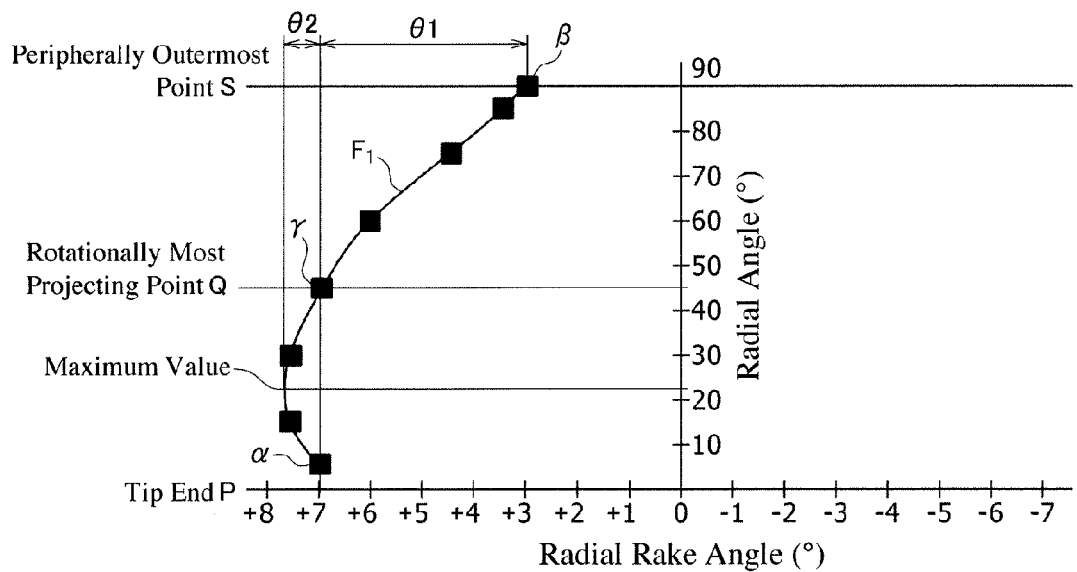
FIG. 8 is a graph showing the relation between a radial rake angle and a radial angle in the insert according to an embodiment of the present invention.

FIG. 8 shows a curve $F_1$ representing the relation between a radial rake angle and a radial angle shown in FIG. 7. In the present invention, as is clear from FIG. 8, a radial rake angle $\alpha$ near the tip end P (radial angle=5°) is larger than a radial rake angle $\beta$ at the peripherally outermost point S at which the radial angle is 90°, and a radial rake angle $\gamma$ at the rotationally most projecting point Q is equal to or larger than the radial rake angle $\alpha$ near the tip end P. The radial angle is an angle of a radial straight line to the rotation axis L1. Because there is substantially no rake face at the tip end P, the radial rake angle $\alpha$ near the tip end P, which is represented by a radial rake angle $\alpha$ at a position separate from the tip end P by a radial angle of 5°, is used in the present invention. The above relation is expressed by the formula of $\beta<\alpha\leq\gamma$.

The purpose of $\beta<\alpha$ is to reduce cutting resistance near the tip end P of the arcuate cutting edge 51d1 for good biting performance to a work, and to secure sufficient cutting edge strength because chips are thicker at the peripherally outermost point S of the arcuate cutting edge 51d1. The purpose of making the radial rake angle $\gamma$ at the rotationally most projecting point Q equal to or larger than the rake angle $\alpha$ near the tip end P is to provide small cutting resistance to the arcuate cutting edge at the rotationally most projecting point Q, which comes into contact with a work first, thereby achieving good biting performance to a work.

The radial angle at the rotationally most projecting point Q is preferably in a range of 30-47°. When the radial angle at the rotationally most projecting point Q is 47° or less, a region with a negative axial rake angle is short in a range from the tip end P of the arcuate cutting edge 51d1 to the rotationally most projecting point Q, effective for making chips thinner, thereby reducing cutting resistance. Also, a region with a positive axial rake angle can be long in a range from the rotationally most projecting point Q to the point R, effective for improving chip removal. Thus, chips are discharged outward from a tangent line of a rotation locus of the tool and slantingly upward from a cut work surface (good detachability of chips from the cutting edge), avoiding a trouble that chips are bitten into a gap between the cutting edge and the work.

When the radial angle at the rotationally most projecting point Q is more than 47°, the rotationally most projecting point Q is too distant from the tip end P, an impinging work applies large impact to the arcuate cutting edge at the rotationally most projecting point Q, and thick chips are generated, resulting in poor chip removal. When the radial angle at the rotationally most projecting point Q is less than 30°, an absolute value of a negative axial rake angle in a range from the tip end P to the rotationally most projecting point Q is too large, resulting in increased cutting resistance, and poor chip removal near the rotation center of the cutting edge. The radial angle at the rotationally most projecting point Q is more preferably in a range of 35-40°.

The difference between the radial rake angle $\alpha$ and the radial rake angle $\beta$ is preferably 2-6°. The difference between the radial rake angle $\gamma$ and the radial rake angle $\alpha$ is preferably 0-2°. The difference between the radial rake angle $\gamma$ and the radial rake angle $\beta$ is preferably 2-6°. The difference between the maximum value of the radial rake angle and the radial rake angle $\gamma$ is preferably 0.1-1.0°. With the above relations met, the radial rake angle changes along such a smooth curve that the radial rake angle increases relatively largely in a range from near the tip end P to a point of the maximum value, and gradually decreases in a range from the point of the maximum value to the peripherally outermost point S via the rotationally most projecting point Q.

Among the radial rake angles $\alpha$, $\beta$ and $\gamma$, at least the radial rake angle $\gamma$ is preferably a positive angle. Other radial rake angles $\alpha$ and $\beta$ may be negative angles. When a work with good cuttability such as spheroidal graphite cast iron, which has small cutting resistance with small vibration, is finish-cut, all of the radial rake angles $\alpha$, $\beta$ and $\gamma$ are preferably positive angles to achieve good biting performance to a work. Specifically, the conditions of $2°\leq\alpha\leq10°$, $0°\leq\beta\leq6°$, and $3°\leq\gamma\leq14°$ are preferably met. Though a positive radial rake angle provides the cutting edge with decreased cracking resistance, the cracking resistance does not matter in finishing because of small cutting depth.

With $2°\leq\alpha\leq10°$, cutting resistance near the tip end P (radial angle=5°) is small, securing sufficient cutting edge strength while keeping good biting performance to a work. When $\alpha<2°$, there is large cutting resistance near the tip end P, resulting in poor biting performance to a work. In addition, the chip removal decreases, so that the tip end portion of the ball-end mill is likely clogged with chips, resulting in the seizure of chips, poor cut surfaces, etc. When $\alpha>10°$, the arcuate cutting edge has insufficient strength near the tip end P.

With $0°\leq\beta\leq6°$, good cut surface conditions are obtained by small cutting resistance, while securing sufficient cutting edge strength at the peripherally outermost point S. When $\beta<0°$, there is large cutting resistance at the peripherally outermost point S, generating vibration to deteriorate cut surface conditions. When $\beta>6°$, the arcuate cutting edge has insufficient strength at the peripherally outermost point S.

With $3°\leq\gamma\leq14°$, cutting resistance is small at the rotationally most projecting point Q at which the cutting edge comes into contact with a work first, resulting in good biting to a work. When $\gamma<3°$, there is large cutting resistance at the rotationally most projecting point Q, resulting in poor biting to a work. When $\gamma>14°$, the cutting edge has insufficient strength at the rotationally most projecting point Q.

In the case of cutting a high-hardness work having large cutting resistance, however, the radial rake angle $\beta$, the radial rake angle $\alpha$ and the radial rake angle $\gamma$ are preferably made negative in this order to increase cutting edge strength. In this case, to have good biting to a work, the radial rake angle $\gamma$ is preferably close to 0° even when it is negative. In the case of cutting a high-hardness work having relatively large cutting resistance, the radial rake angles $\alpha$, $\beta$ and $\gamma$ preferably meet the conditions of $-6°\leq\alpha\leq-0.5°$, $-10°\leq\beta\leq-2°$, and $-6°\leq\gamma\leq-0.5°$, in addition to the relation of $\beta<\alpha\leq\gamma$.

By making the radial rake angles $\alpha$, $\beta$ and $\gamma$ negative, the entire arcuate cutting edge is strengthened, resulting in improved cracking resistance in cutting a high-hardness work having Rockwell hardness of 45 HRC or more. The negative radial rake angle, which provides the cutting edge with large cutting resistance and poor chip removal, leads to little increase in cutting resistance and little deterioration of chip removal in the finishing of a high-hardness work, because finishing has smaller cutting depth than in roughing and semi-finishing.

With the condition of $-6°\leq\alpha\leq-0.5°$ met, cutting edge strength necessary for finishing a high-hardness work can be secured with good biting, without excessive cutting resistance at and near the tip end P. In the case of $\alpha>-0.5°$, cutting edge strength at the tip end P is insufficient, resulting in the cracking, etc. of the cutting edge. In the case of $\alpha<-6°$, the arcuate cutting edge has excessive cutting resistance at and near the tip end P, resulting in wearing of the cutting edge, the seizure of chips, the deteriorated cut surface conditions of a work, etc.

With the condition of $-10°\leq\beta\leq-2°$ met, cutting edge strength necessary for finishing a high-hardness work can be secured at the peripherally outermost point S. In the case of $\beta>-2°$, cutting edge strength is insufficient at the peripherally outermost point S. In the case of $\beta<-10°$, cutting resistance is excessive at the peripherally outermost point S, resulting in extreme vibration and heat generation, and thus poor cut surface conditions of a work.

With the condition of $-6°\leq\gamma\leq-0.5°$ met, cutting edge strength necessary for finishing a high-hardness work can be secured at the rotationally most projecting point Q at which the cutting edge first comes into contact with the work, and the tool can be stably held particularly in finishing a high-hardness material by properly controlling a thrust force component in a longitudinal direction of the tool. In the case of $\gamma>-0.5°$, cutting edge strength necessary for finishing a high-hardness work cannot be secured at the rotationally most projecting point Q. In the case of $\gamma<-6°$, cutting resistance is excessive at the rotationally most projecting point Q, resulting in insufficient biting to a high-hardness work.

The radial rake angle of the arcuate cutting edge has a peak (maximum) in a range from a point near the tip end P (radial angle=5°) of the arcuate cutting edge to the rotationally most projecting point Q, and continuously decreases in a range from the rotationally most projecting point Q to the peripherally outermost point S. Specifically, the maximum value of the radial rake angle of the arcuate cutting edge is located in a radial angle range of 12-40°, preferably 15-30°. With this structure, good balance is obtained between the biting performance to a work and the cutting edge strength.

The arcuate cutting edge first comes into contact with a work at the rotationally most projecting point Q, and its contact region with the work then expands in both directions on the side of the tip end P and on the side of the peripherally outermost point S, by the rotation of the cutting edge. Accordingly, with the maximum value of the radial rake angle located in a range from a point near the tip end P (radial angle=5°) to the rotationally most projecting point Q, the cutting resistance can be reduced even if the axial rake angle is negative. With a continuously decreasing radial rake angle in a range from the rotationally most projecting point Q to the peripherally outermost point S, sufficient cutting edge strength can be secured with reduced cutting resistance.

The point Q at which the arcuate cutting edge is most projecting forward in a rotation direction R, which is called "rotationally most projecting point," is preferably in a radial angle range of 30-47°. This expands a region in which the arcuate cutting edge in an S shape when viewed from the front side has a positive axial rake angle (narrows a negative-axial-rake-angle region), thereby securing sufficient strength of the arcuate cutting edge even with high cutting resistance. Also, with an expanded region in which the axial rake angle is positive, good chip removal is achieved while sufficiently keeping the strength of the arcuate cutting edge.

Figure 10:
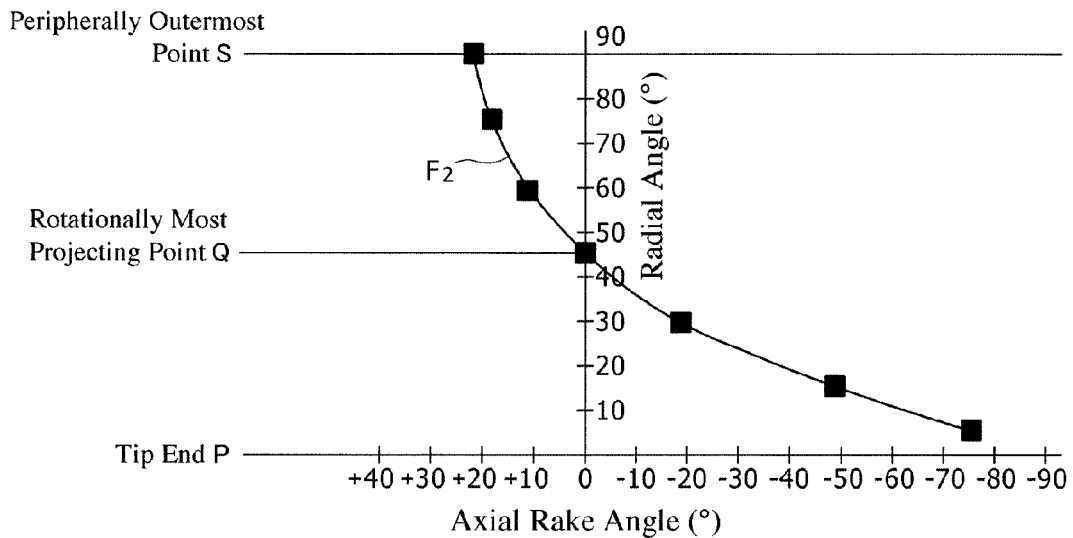
FIG. 10 is a graph showing the relation between an axial rake angle and a radial angle in the insert according to an embodiment of the present invention.

The radial rake angle of the arcuate cutting edge preferably meets the relation of $\theta1<\theta2$, wherein $\theta1$ is a radial rake angle in a range from the rotationally most projecting point Q to the peripherally outermost point S, and $\theta2$ is a radial rake angle in a range from the rotationally outermost point Q to near the tip end P (radial angle=5°). As shown in FIG. 10, a range having a radial rake angle $\theta1$ (from the rotationally most projecting point Q to the peripherally outermost point S) corresponds to a range in which an axial rake angle is positive, and a range having a radial rake angle $\theta2$ (from the rotationally most projecting point Q to a point near the tip end P) corresponds to a range in which an axial rake angle is negative. With the condition of $\theta1<\theta2$ met, (a) the cutting resistance is small in a negative axial rake angle region, with enough cuttability when chips are thin, and (b) the strength of the arcuate cutting edge is sufficient near the peripherally outermost point S at which chips are thick.

(2) Axial Rake Angle

In the insert of the present invention, the axial rake angle also changes depending on the radial angle. In an example of one cutting edge 51*d*1 shown in FIG. 9, the axial rake angle at a radial angle of 15°, 30°, 45°, 60° and 75° is −48.409°, −18.257°, 0°, +12.069° and 19.38°, respectively.

The axial rake angle of the arcuate cutting edge is preferably negative in a range from the tip end P to a point just not reaching the rotationally most projecting point Q, 0° at the rotationally most projecting point Q, and positive in a range exceeding the rotationally most projecting point Q and reaching the peripherally outermost point S. In a range from the tip end P to the rotationally most projecting point Q, a negative axial rake angle gradually increases in a positive direction. In a range exceeding the rotationally most projecting point Q and reaching the peripherally outermost point S, a positive axial rake angle gradually increases. As shown in FIG. 10, the axial rake angle is preferably about −70° to about −80° near the tip end P, and about +20° at the peripherally outermost point S.

With the axial rake angle of about +20° at the peripherally outermost point S, chips are removed in a direction perpendicular to a tangent line of a rotation locus of the tool, resulting in good chip removal. On the other hand, the axial rake angle of smaller than +20° near the peripherally outermost point S provides poor chip removal, and the axial rake angle of larger than +20° near the peripherally outermost point S makes a cutting edge too thin, failing to secure its stiffness.

With the axial rake angle of about −70° to about −80° near the tip end P, a work-cutting stress is applied to the end mill body 2 along the rotation axis L, thereby reducing the flexure of the end mill body 2 without making chip removal difficult.

The radial rake angle and axial rake angle of the arcuate cutting edge is measured by a non-contact three-dimensional digitizer, etc. The above explanations of the radial rake angle and the axial rake angle are applicable to both arcuate cutting edges 51*d*1, 51*d*2.

(B) Other Conditions

Figure 11:
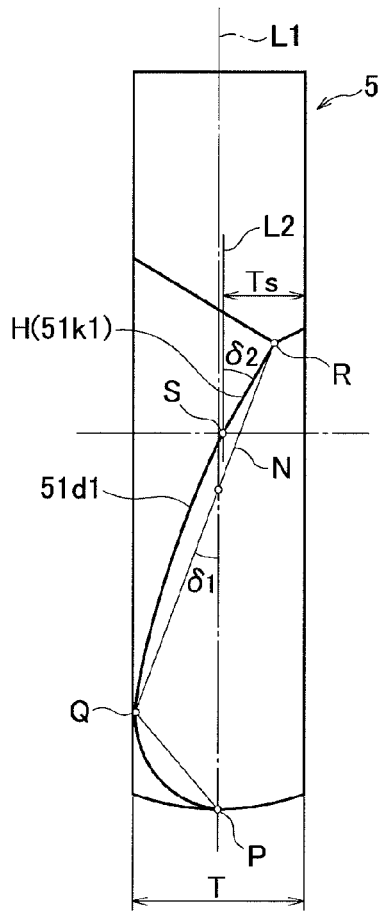
FIG. 11 is a side view showing an insert according to an embodiment of the present invention.

As shown in FIG. 11, a crossing angle $\delta1$ of a line N connecting the rotationally most projecting point Q of the arcuate cutting edge 51*d*1 and the rear end point R of the peripheral cutting edge 51*k*1 to the rotation axis L1 is preferably smaller than a crossing angle $\delta2$ of a line H connecting the peripherally outermost point S of the arcuate cutting edge 51*d*1 and the rear end point R of the peripheral cutting edge 51*k*1 to a straight line L2 parallel with the rotation axis L1. Namely, $\delta1<\delta2$ is preferably met. This alleviates impact when the arcuate cutting edge 51*d*1 comes into contact with a work, thereby providing the cutting edge with high cracking resistance and chipping resistance.

Oppositely, with δ1≥δ2, there is large impact at the contact of the arcuate cutting edge 51d1 with a work, providing the arcuate cutting edge 51d1 with reduced cracking resistance and chipping resistance.

The inclination angle δ1 of the line N is preferably 15-30°. This enables chips to be discharged outward from the tool and slantingly upward from a cut surface of the work (good separation of chips from the insert cutting edges) during cutting, thereby avoiding chips from entering a gap between the cutting edge and the work, and thus reducing cutting resistance and its amplitude. Namely, good chip removal from the cutting edges reduces cutting resistance, and decreased cutting resistance amplitude suppresses the vibration of the tool, thereby improving the cut surface conditions of a work.

When the inclination angle δ1 of the line N is less than 15°, the chip removal direction is substantially aligned with a tangent line of a rotation locus of the tool, meaning that the tool follows chips. As a result, chips are bitten into a gap between the cutting edge and the work. This trouble occurs particularly in the contour cutting of a corner. When the inclination angle δ1 of the line N exceeds 30°, the spirally-shaped, peripheral cutting edge cannot be sufficiently long, and the peripheral cutting edge is thin, resulting in low cutting edge strength. Further, because of a large cutting resistance amplitude, vibration occurs during cutting, resulting in deteriorated surface roughness of a work. δ1 is more preferably 20-30°.

To increase the number of regrinding the cutting edges, the length F (mm) of the peripheral cutting edge 51k1 (line H) preferably meets the condition of 0.2 T≤F≤0.5 T. When F is less than 0.2 T, the peripheral cutting edge 51k1 is too short, resulting in a small number of regrinding. When F is more than 0.5 T, the peripheral cutting edge 51k1 is longer than necessary, resulting in drastically increased cutting resistance, and inducing vibration during cutting.

The thickness $T_S$ (mm) of the insert 5 at the peripherally outermost point S preferably meets the condition of 0.4 T≤$T_S$<0.5 T. When $T_S$ is less than 0.4 T, the cutting edge has too low stiffness. On the other hand, when $T_S$ is 0.5 T or more, the cutting edge is too large in cutting resistance and its amplitude, likely resulting in large tool vibration during cutting. $T_S$ is more preferably 0.45 T-0.49 T.

The insert 5 having such a shape can be formed, for example, by cemented carbide comprising tungsten carbide (WC) and cobalt (Co).

[3] Production Method of Insert

The insert 5 of WC-based cemented carbide can be produced, for example, by the following process. Granules of a mixture comprising tungsten carbide powder, cobalt powder, and if necessary, additives are first molded by a powder metallurgy method, etc. A screw-penetrating hole is formed at the time of molding. A green body should be formed larger by sintering shrinkage of 20-30%. The green body is sintered at about 1300-1400° C.

The resultant sintered body is subjected to NC-controlled three-dimensional grinding, to form arcuate cutting edges 51d1, 51d2, spirally-shaped, peripheral cutting edges 51k1, 51k2, and oblique bottom surfaces 52b1, 52b2. To provide the arcuate cutting edges with desired radial rake angle and axial rake angle, NC-controlled working using a disc-shaped thin diamond grinder, etc. is carried out.

A surface of the resultant insert 5 except for the screw-penetrating hole is provided with a coating having wear resistance and heat resistance by a PVD method. The coating may be made of, for example, Ti—Al nitride, Ti—Si nitride, Ti—B nitride, etc.

The same coating as described above on the end mill body 2 provides the indexable ball-end mill with a longer life. Particularly to reduce friction resistance with chips, it is preferable to form a Ti—B nitride coating having wear resistance and lubrication on the end mill body 2.

[4] Indexable Ball-End Mill

Figure 12:
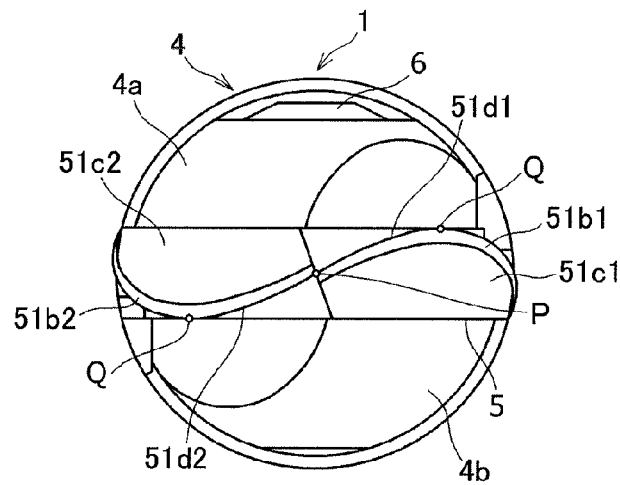
FIG. 12 is a front view showing the indexable ball-end mill of FIG. 1.
Figure 13:
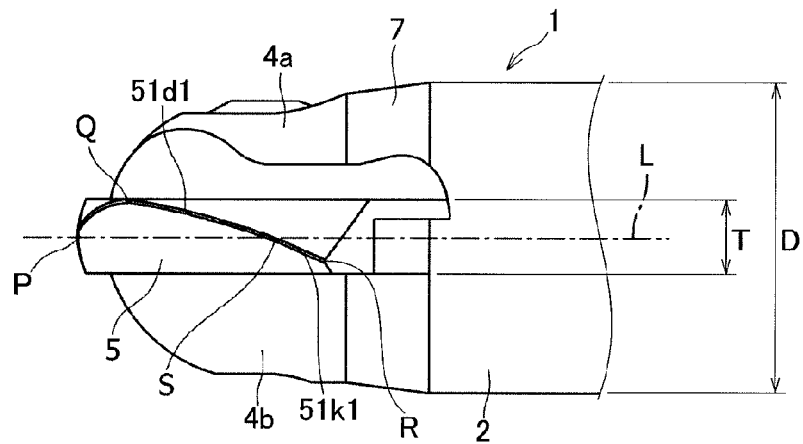
FIG. 13 is a side view showing a tip end portion of the indexable ball-end mill of FIG. 1.
Figure 14:
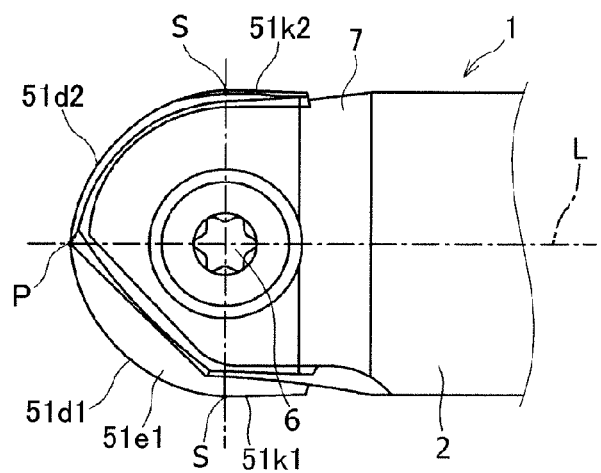
FIG. 14 is a side view showing a tip end portion of the indexable ball-end mill of FIG. 1 in a direction perpendicular to FIG. 13.

FIGS. 12, 13 and 14 show an indexable ball-end mill 1, in which the insert 5 is fixed to a slit 8 of an end mill body 2 by a clamp screw 6. With the insert 5 fixed to the slit 8 by the clamp screw 6, both side surfaces 51a1, 51a2 of the insert 5 come into close contact with both inner surfaces 8a, 8b of the slit 8, and oblique bottom surfaces 52b1, 52b2 of the insert 5 come into close contact with the bottom surface 8c of the slit 8, so that the insert 5 is positioned with high accuracy.

The tip end P of the insert 5 slightly projects from the slit 8 along the rotation axis L, and the cutting edges comprising a pair of arcuate cutting edges 51d1, 51d2 and a pair of peripheral cutting edges 51k1, 51k2 and the first and second flanks 51b1, 51b2, 51c1, 51c2 also slightly project from the slit 8. The thickness T (mm) of the insert 5 is preferably 0.2 D-0.5 D, wherein D (mm) is an outer diameter of the end mill. With this condition met, sufficiently deep flute grooves are obtained while securing sufficient strength in the arcuate cutting edges. An indexable ball-end mill 1 to which an insert 5 having a pair of cutting edges is attached corresponds to a two-flute ball-end mill.

[5] Solid Ball-End Mill

The present invention is applicable not only to indexable ball-end mills but also to solid (solid-type) ball-end mills. The solid ball-end mill basically does not differ from the indexable ball-end mill, except that the insert is integral with a tip end portion of the end mill. Of course, the solid ball-end mill preferably has the above features with respect to the radial rake angle and axial rake angle of the arcuate cutting edge.

The present invention will be explained in more detail by Examples below without intention of restricting the present invention thereto.

Example 1

Produced as a cemented carbide insert to be attached to a slit in a tip end portion of a shank-type end mill body having a cutting diameter of 30 mm, a shank diameter of 32 mm, an entire length of 250 mm, and an under-neck length of 180 mm, were three types of inserts 1-3 each having a thickness T of 7.2 mm and a shape shown in FIGS. 5 and 6, and comprising arcuate cutting edges each having a radius of 15 mm, and spirally-shaped, peripheral cutting edges each having a length of 3.0 mm. With respect to each insert, the radial rake angle and axial rake angle of an arcuate cutting edge were measured at each radial angle by a non-contact three-dimensional digitizer. The radial rake angle and axial rake angle at each radial angle are shown in Table 1. The radial rake angle at the peripherally outermost point S (radial angle: 90°) was 0°, +3.0° and +6.0°, respectively, in the inserts 1 to 3.

To cut a wall (inclination angle: 85°) of a work of spheroidal graphite cast iron (FCD700), a machining center was controlled to use each arcuate cutting edge near the peripherally outermost point S of the insert attached to the end mill body.

TABLE 1-1

| Insert | Radial Rake Angle (°) | | | | | |
|---|---|---|---|---|---|---|
| Radial Angle | 5° | 30° | 45° | 60° | 85° | 90° |
| 1 | +4.0 | +4.5 | +4.0 | +3.0 | +0.5 | 0 |
| 2 | +7.0 | +7.5 | +7.0 | +6.0 | +3.5 | +3.0 |
| 3 | +10.0 | +10.5 | +10.0 | +9.0 | +6.5 | +6.0 |

TABLE 1-2

| Insert | Axial Rake Angle (°) | | | | | |
|---|---|---|---|---|---|---|
| Radial Angle | 5° | 30° | 45° | 60° | 85° | 90° |
| 1 | −75.5 | −18.3 | 0 | +12.1 | +20.0 | +22.0 |
| 2 | −75.5 | −18.3 | 0 | +12.1 | +20.0 | +22.0 |
| 3 | −75.5 | −18.3 | 0 | +12.1 | +20.0 | +22.0 |

The cutting conditions of a work were as follows:
Cutting method: Dry cutting with air blow,
Cutting speed (Vc): 754 m/minute,
Number of rotation: 8000 rpm,
Feed (Vf): 7500 mm/minute,
Feed per edge (fz): 0.47 mm/tooth,
Radial cutting depth ae: 0.15 mm and 0.3 mm,
Pick feed (pf): 0.5 mm, and
Tool overhang (OH): 180 mm.

The optical photomicrographs (18 times) of FIG. 15 show the surface roughness Ry of surfaces cut with the radial cutting depths ae of 0.15 mm and 0.3 mm, respectively. The surface roughness Ry in FIG. 15 was measured when the cutting distance of a work wall reached 5 m.

A target surface roughness Ry of finished surfaces of a die for molding exterior automotive body panels is generally 10 μm or less, and surface roughness Ry better than the target was achieved at radial cutting depths ae of 0.15 mm and 0.3 mm as shown in FIG. 15. The surface roughness was better at the radial cutting depth ae of 0.15 mm.

The cut surface roughness Ry obtained by an indexable ball-end mill having the insert 2 with a radial rake angle β of +3.0° was 4.3 μm when cut at a radial cutting depth ae of 0.3 mm, and 4.4 μm when cut at a radial cutting depth ae of 0.3 mm, smaller than when other inserts 1 and 3 were used. This indicates that the radial rake angle β is preferably about 3° in finishing a slanting wall of a work of FCD700, having in mind a die for molding exterior automotive body panels.

Example 2

The same insert as in Example 1 except that a radial rake angle at a radial angle of 5°, 30°, 45°, 60°, 85° and 90° was +1.0°, +1.5°, +1.0°, 0°, −2.5° and −3.0°, respectively, was attached to the same end mill body as in Example 1, to cut a wall (inclination angle: 85°) of a hard work of SKD11 having Rockwell hardness of 60 HRC under the following conditions. The resultant cut surface had surface roughness Ry of 2-3 μm, indicating that even a hard work can be cut with high finishing accuracy.

Cutting method: Dry cutting with air blow,
Cutting speed (Vc): 400 m/minute,
Number of rotation: 4244 rpm,
Feed speed (Vf): 2550 mm/minute,
Feed per edge (fz): 0.3 mm/tooth,
Radial cutting depth ae: 0.1 mm,
Pick feed (pf): 0.3 mm, and
Tool overhang (OH): 120 mm.

Example 3

The same insert as in Example 1 except that a radial rake angle at a radial angle of 5°, 30°, 45°, 60°, 85° and 90° was −2.5°, −2.0°, −2.5°, −3.5°, −6.0° and −6.5°, respectively, was attached to the same end mill body as in Example 1, to cut a wall (inclination angle: 85°) of a hard work of SKD11 having Rockwell hardness of 60 HRC under the following conditions. The resultant cut surface had surface roughness Ry of 2-3 μm, indicating that even a hard work can be cut with high finishing accuracy.

Cutting method: Dry cutting with air blow,
Cutting speed (Vc): 400 m/minute,
Number of rotation: 4244 rpm,
Feed (Vf): 2550 mm/minute,
Feed per edge (fz): 0.3 mm/tooth,
Radial cutting depth ae: 0.1 mm,
Pick feed (pf): 0.3 mm, and
Tool overhang (OH): 120 mm.

Example 4, and Comparative Examples 1 and 2

Cemented carbide inserts having the same shape as in Example 1 except for the parameters shown in Table 2 were produced.

TABLE 2

| No. | Radius[1] (mm) | T[2] (mm) | Clearance Angle (°) | δ1 (°) | δ2 (°) | κ[3] (°) | α < γ | $T_S$ (mm) | F (mm) |
|---|---|---|---|---|---|---|---|---|---|
| Example 4 | 15 | 7.2 | 15 | 20 | 25 | 45 | Yes | 0.48 T | 0.42 T |
| Com. Ex. 1 | 15 | 7.2 | 15 | 8 | 18 | 60 | Yes | 0.80 T | 0.42 T |
| Com. Ex. 2 | 15 | 7.2 | 15 | 6 | 6 | 90 | No | 0.98 T | 0.42 T |

Note:
[1]The radius of an arcuate cutting edge.
[2]The thickness of the insert.
[3]The radial angle at the rotationally most projecting point Q.

Figure 16:
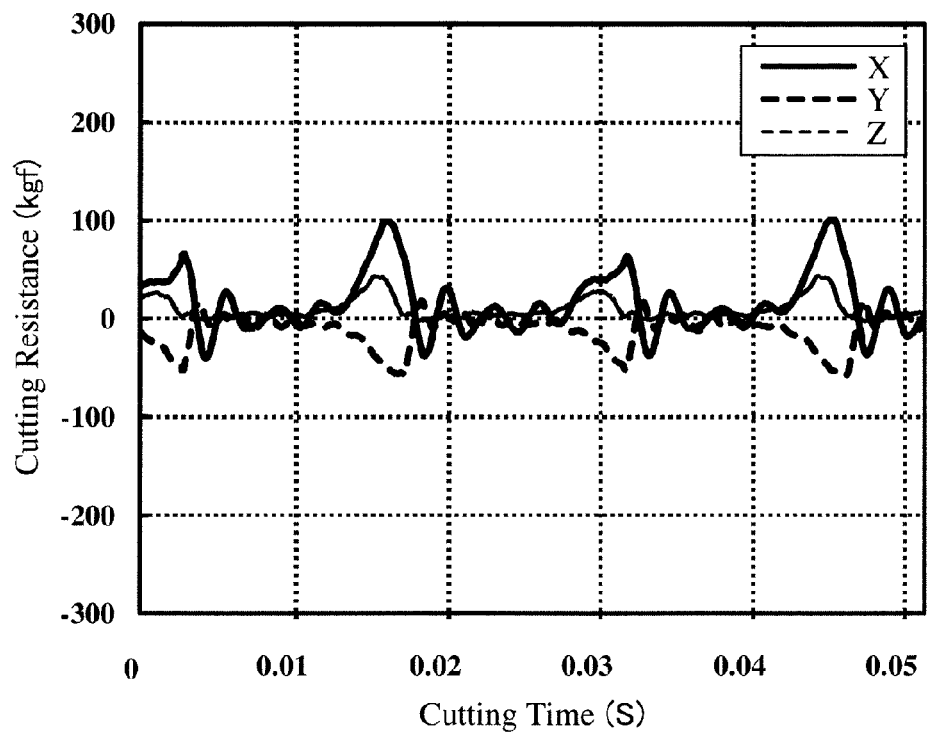
FIG. 16 is a graph showing the dynamic change of cutting resistance when cut by an indexable ball-end mill having the insert of Example 1.
Figure 17:
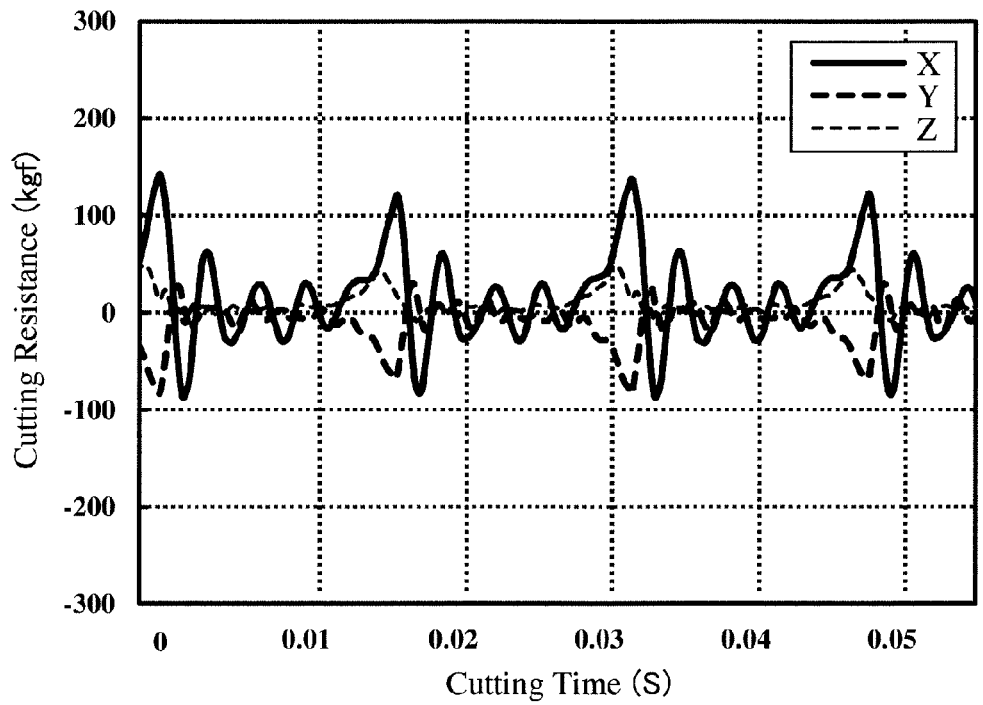
FIG. 17 is a graph showing the dynamic change of cutting resistance, when cut by an indexable ball-end mill having the insert of Comparative Example 1.
Figure 18:
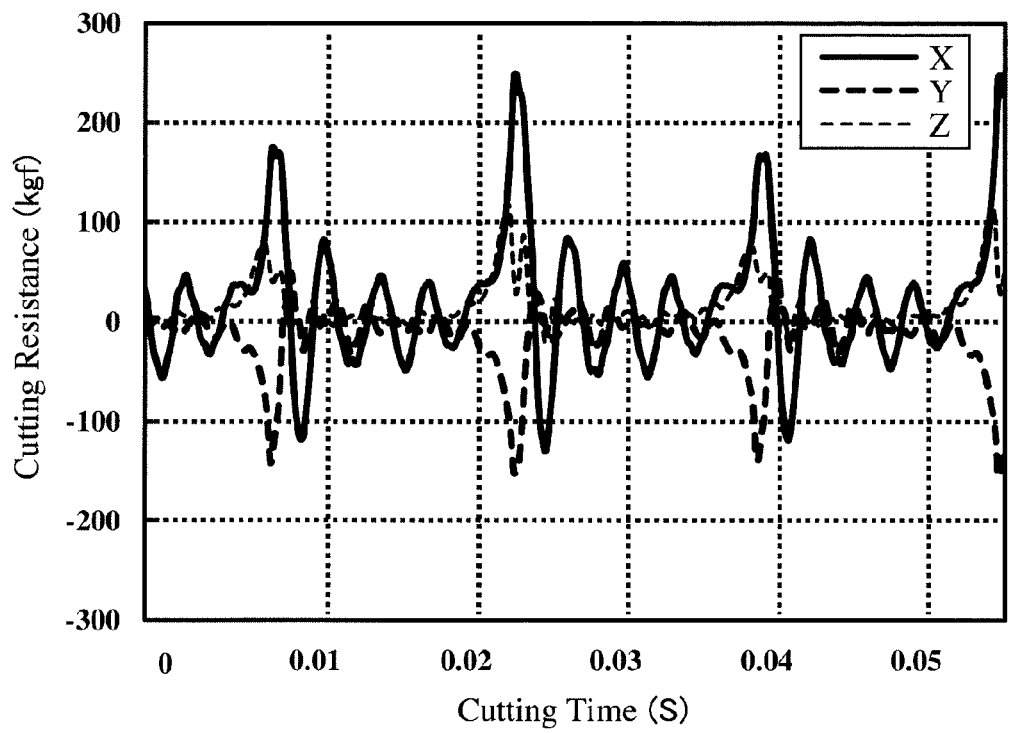
FIG. 18 is a graph showing the dynamic change of cutting resistance, when cut by an indexable ball-end mill having the insert of Comparative Example 2.

Each insert of Example 4, and Comparative Examples 1 and 2 was attached to a slit in a tip end portion of a shank-type end mill body having a cutting diameter of 30 mm, a shank diameter of 32 mm, an entire length of 220 mm, and an under-neck length of 120 mm, to constitute an indexable ball-end mill. With each indexable ball-end mill mounted to a main spindle of a milling machine, shoulder cutting was carried out under the following cutting conditions, to measure the dynamic change of cutting resistance by a cutting dynamometer (available from Kistler). The cutting resistance and the chip shapes are shown in Table 3, and the dynamic change of cutting resistance is shown in FIGS. 16-18 as cutting resistance components in X, Y and Z directions. In the figure, the Y direction is a tool-feeding direction, the X direction is perpendicular to the Y direction (tangential direction of rotation), and the Z direction is a rotation axis direction.

Work: S50C (hardness, 220 HB),
Cutting method: Dry shoulder cutting with air blow,
Cutting speed (Vc): 200 m/minute,
Number of rotation: 2122 rpm,
Feed (Vf): 849 mm/minute,
Feed per edge (fz): 0.2 mm,
Radial cutting depth ae: 0.5 mm,
Cutting depth: 15 mm, and
Tool overhang (OH): 180 mm.

TABLE 3

| No. | Cutting Resistance (kgf) | Shape of Chips |
| --- | --- | --- |
| Example 4 | 100 | Largely twisted |
| Com. Ex. 1 | 140 | Slightly twisted |
| Com. Ex. 2 | 250 | Not twisted |

The dynamic change of cutting resistance was smaller in Example 4 than in Comparative Examples 1 and 2. Particularly, the cutting resistance (100 kgf) in an X direction in Example 4 satisfied the target. The cutting resistance in Example 4 was 60% lower than the cutting resistance (250 kgf) in Comparative Example 2.

Figure 19:
FIG. 19 is a photograph showing chips generated when cut by an indexable ball-end mill having the insert of Example 1.
Figure 20:
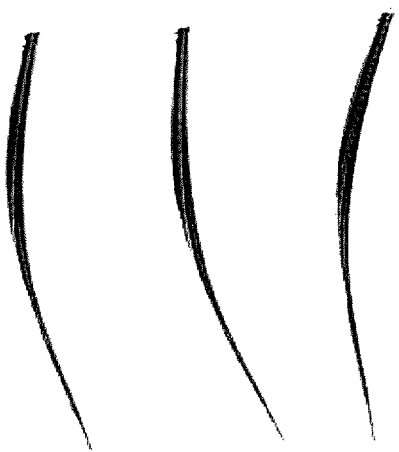
FIG. 20 is a photograph showing chips generated when cut by an indexable ball-end mill having the insert of Comparative Example 1.
Figure 21:
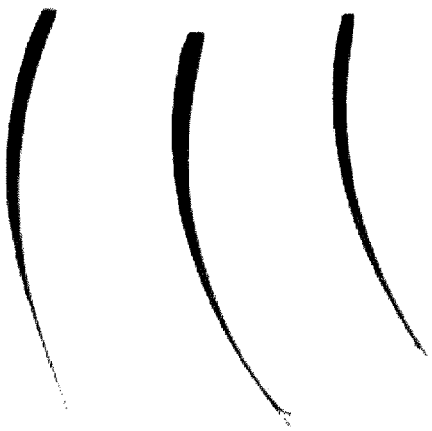
FIG. 21 is a photograph showing chips generated when cut by an indexable ball-end mill having the insert of Comparative Example 2.

FIGS. 19-21 show chips generated by cutting in Example 4 and Comparative Examples 1 and 2. Chips in Example 4 were more twisted than chips in Comparative Examples 1 and 2, because of a wider positive axial rake angle region of each arcuate cutting edge with a larger twisting angle. Also, the chip shapes indicate that chips were discharged slantingly upward from the cut surface. Namely, a trouble that chips are bitten into a gap between the cutting edge and the work was avoided in Example 4. In the inserts of Comparative Examples 1 and 2, however, chips were bitten into a gap between the cutting edge and the work.

Effects of the Invention

Because the radial rake angles $\alpha$, $\beta$ and $\gamma$ of each arcuate cutting edge meet the condition of $\beta<\alpha\leq\gamma$ in the solid or indexable ball-end mill and insert of the present invention, cutting resistance is small in an entire region of the arcuate cutting edge, resulting in good chip removal. Accordingly, vibration is suppressed, suitable for three-dimensional finishing of a work.

With the axial rake angle of each arcuate cutting edge being negative in a range from the tip end P to the rotationally most projecting point Q, 0° at the rotationally most projecting point Q, and positive in a range from the rotationally most projecting point Q to the peripherally outermost point S, the arcuate cutting edge first comes into contact with a work at the rotationally most projecting point Q, and a contact region with the work expands in both directions on the side of the tip end P and on the side of the peripherally outermost point S by the rotation of the cutting edge, resulting in reduced cutting resistance.

With the radial rake angle of the arcuate cutting edge continuously increasing in a range from the tip end P to the rotationally most projecting point Q, cutting resistance is low even with a negative axial rake angle.

By making the axial rake angle of the arcuate cutting edge positive (about +20°) near the peripherally outermost point S, chips are removed in a direction perpendicular to a tangent line of a rotation locus of the arcuate cutting edge. The clogging of chips is thus suppressed by good chip removal, resulting in good surface roughness on the finished oblique surface of a work.

Because chips are discharged outward in a tangential direction of a rotation locus and slantingly upward from the cut surface, it is possible to avoid a trouble that chips are bitten into a gap between the cutting edge and the work. Second, the cutting edge is provided with improved cracking resistance and chipping resistance, resulting in a longer life while avoiding its deterioration. Third, not only cutting resistance but also its amplitude are reduced, resulting in suppressed vibration, and improved surface conditions of the cut work surface.

What is claimed is:

1. A ball-end mill comprising, in a tip end portion of an end mill body, arcuate cutting edges each extending from a tip end to a peripherally outermost point along a curve in an S shape when viewed from the front side, spirally-shaped, peripheral cutting edges each smoothly connected to each arcuate cutting edge, and a convex rake face of each arcuate cutting edge protruding forward in a rotation direction;

each of said arcuate cutting edges having a radial rake angle meeting the condition of $\beta<\alpha\leq\gamma$, wherein $\alpha$ is a radial rake angle at a radial angle of 5°, $\beta$ is a radial rake angle at a radial angle of 90°, and $\gamma$ is a radial rake angle at a rotationally most projecting point of said arcuate cutting edge;

the radial rake angle of said arcuate cutting edge having the maximum value between said tip end and said rotationally most projecting point and in a radial angle range of 12-40°; and said radial rake angle changing along such a smooth curve that said radial rake angle gets gradually smaller in a range from a point of said maximum value to said peripherally outermost point via said rotationally most projecting point.

2. The ball-end mill according to claim 1, wherein said radial rake angle $\gamma$ is a positive angle.

3. The ball-end mill according to claim 1, wherein said radial rake angle $\beta$ is a positive angle of 0° or more.

4. The ball-end mill according to claim 1, wherein the difference between said radial rake angle $\alpha$ and said radial rake angle $\beta$ is 2-6°; the difference between said radial rake angle $\gamma$ and said radial rake angle $\alpha$ is 0-2°; the difference between said radial rake angle $\gamma$ and said radial rake angle $\beta$ is 2-6°; and the difference between the maximum value of said radial rake angle and said radial rake angle $\gamma$ is 0.1-1.0°.

5. The ball-end mill according to claim 1, wherein the radial rake angle of said arcuate cutting edge has the maximum value in a radial angle range of 15-30°.

6. The ball-end mill according to any one of claim 1, wherein said arcuate cutting edge has a rotationally most projecting point at a position at which said radial angle is 30-47°.

7. The ball-end mill according to any one of claim 1, wherein the radial rake angle of said arcuate cutting edge meets the relation of $\theta1<\theta2$, wherein $\theta1$ is a radial rake angle in a range from said rotationally most projecting point to said peripherally outermost point, and $\theta2$ is a radial rake angle in a range from said rotationally most projecting point to said tip end.

8. The ball-end mill according to claim 1, wherein an axial rake angle of said arcuate cutting edge is negative in a range from said tip end to said rotationally most projecting point, and positive in a range exceeding said rotationally most projecting point and reaching said peripherally outermost point.

9. An insert comprising arcuate cutting edges each extending from a tip end to a peripherally outermost point along a curve in an S shape when viewed from the front side, spirally-shaped, peripheral cutting edges each smoothly connected to each arcuate cutting edge, and a convex rake face of each arcuate cutting edge protruding forward in a rotation direction;
   each of said arcuate cutting edges having a radial rake angle meeting the condition of $\beta < \alpha \leq \gamma$, wherein $\alpha$ is a radial rake angle at a radial angle of 5°, $\beta$ is a radial rake angle at a radial angle of 90°, and $\gamma$ is a radial rake angle at a rotationally most projecting point of said arcuate cutting edge;
   the radial rake angle of said arcuate cutting edge having the maximum value between said tip end and said rotationally most projecting point and in a radial angle range of 12-40°; and
   said radial rake angle changing along such a smooth curve that said radial rake angle gets gradually smaller in a range from a point of said maximum value to said peripherally outermost point via said rotationally most projecting point.

10. The insert according to claim 9, wherein said radial rake angle $\gamma$ is a positive angle.

11. The insert according to claim 9, wherein said radial rake angle $\beta$ is a positive angle of 0° or more.

12. The insert according to claim 9, wherein the difference between said radial rake angle $\alpha$ and said radial rake angle $\beta$ is 2-6°, the difference between said radial rake angle $\gamma$ and said radial rake angle $\alpha$ is 0-2°, the difference between said radial rake angle $\gamma$ and said radial rake angle $\beta$ is 2-6°, and the difference between the maximum value of said radial rake angle and said radial rake angle $\gamma$ is 0.1-1.0°.

13. The insert according to claim 9, wherein the radial rake angle of said arcuate cutting edge has the maximum value in a radial angle range of 15-30°.

14. The insert according to claim 9, wherein said arcuate cutting edge has a rotationally most projecting point at a position at which said radial angle is 30-47°.

15. The insert according to claim 9, wherein the radial rake angle of said arcuate cutting edge meets the relation of $\theta 1 < \theta 2$, wherein $\theta 1$ is a radial rake angle in a range from said rotationally most projecting point to said peripherally outermost point, and $\theta 2$ is a radial rake angle in a range from said rotationally most projecting point to said tip end.

16. The insert according to a claim 9, wherein the axial rake angle of said arcuate cutting edge is negative in a range from said tip end to said rotationally most projecting point, and positive in a range exceeding said rotationally most projecting point to said peripherally outermost point.

17. The insert according to claim 9, which has a thickness T (mm) in a flat plate portion and a thickness $T_S$ (mm) at said peripherally outermost point S, with the condition of 0.4 $T \leq T_S < 0.5$ T met.

18. The insert according to claim 9, wherein a crossing angle $\delta 1$ of a line connecting the rear end point R of said peripheral cutting edge and said rotationally most projecting point Q to said rotation axis is 15-30°, smaller than a crossing angle $\delta 2$ of a line connecting said peripherally outermost point S and said rear end point R to said rotation axis.

19. The insert according to claim 9, wherein the length of said peripheral cutting edge meets the condition of 0.2 T-0.5 T, wherein T is the thickness (mm) of a flat plate portion of said insert.

20. An indexable ball-end mill comprising the insert recited in claim 9 detachably fixed to a slit of a semispherical tip end portion of an end mill body.

* * * * *